United States Patent
Barnes et al.

(10) Patent No.: US 6,767,106 B2
(45) Date of Patent: Jul. 27, 2004

(54) EDGE-LIT LUMINAIRE HAVING PRISMATIC OPTICAL CONTROL

(75) Inventors: Josh Barnes, Charlevoix, MI (US); Thomas F. Barnes, II, Charlevoix, MI (US); Paul Carlton Belding, Charlevoix, MI (US); Joel Robinson, Charlevoix, MI (US)

(73) Assignee: Lexalite International Corporation, Charlevoix, MI (US)

( * ) Notice: Subject to any disclaimer, the term of this patent is extended or adjusted under 35 U.S.C. 154(b) by 0 days.

(21) Appl. No.: 09/566,583

(22) Filed: May 8, 2000

(65) Prior Publication Data

US 2002/0001188 A1 Jan. 3, 2002

(51) Int. Cl.[7] ................................................ F21V 7/04
(52) U.S. Cl. ........................ 362/31; 362/559; 362/328; 362/330; 362/333; 362/339
(58) Field of Search .............................. 362/23, 26, 29, 362/31, 551, 554, 556, 558, 559, 560, 217, 223, 257, 260, 296, 297, 300, 317, 326, 327, 328, 330, 333, 27

(56) References Cited

U.S. PATENT DOCUMENTS

| | | | | |
|---|---|---|---|---|
| 4,043,636 A | * | 8/1977 | Eberhardt et al. | ............ 349/65 |
| 4,385,343 A | | 5/1983 | Plumly | |
| 4,386,476 A | | 6/1983 | Schulman | |
| 4,715,137 A | | 12/1987 | Scheve | |
| 4,791,745 A | | 12/1988 | Pohn | |
| 4,799,137 A | | 1/1989 | Aho | |
| 4,975,809 A | | 12/1990 | Ku | |
| 5,122,902 A | * | 6/1992 | Benson | ........................ 359/530 |
| 5,126,882 A | | 6/1992 | Oe et al. | |
| 5,136,480 A | * | 8/1992 | Pristash et al. | ................ 362/31 |
| 5,206,746 A | | 4/1993 | Ooi et al. | |
| 5,283,968 A | * | 2/1994 | Williams | ....................... 40/546 |
| 5,396,350 A | * | 3/1995 | Beeson et al. | ................. 362/31 |
| 5,555,109 A | | 9/1996 | Zimmerman et al. | |
| 5,613,751 A | * | 3/1997 | Parker et al. | .................. 362/31 |
| 5,618,096 A | * | 4/1997 | Parker et al. | .................. 362/31 |
| 5,625,968 A | * | 5/1997 | Ashall | ........................... 40/546 |
| 5,696,627 A | * | 12/1997 | Benson et al. | ............... 359/530 |
| 5,759,468 A | * | 6/1998 | Smith et al. | ................. 264/227 |
| 6,043,936 A | * | 3/2000 | Large | ........................... 359/572 |
| 6,277,470 B1 | * | 8/2001 | Smith et al. | ................. 428/167 |

\* cited by examiner

Primary Examiner—Thomas M. Sember
Assistant Examiner—Ismael Negron
(74) Attorney, Agent, or Firm—Joan Pennington

(57) ABSTRACT

An edge-lit luminaire includes a panel formed of a transparent material. The panel includes first and second opposing surfaces. At least one edge light source is positioned proximate to the panel. A plurality of prismatic reflective/refractive elements is spaced apart on a predefined pattern on the second surface. The plurality of prismatic reflective/refractive elements have a predefined contour for accurate ray direction control. The predefined pattern on the second surface includes predefined gradient spacing and size variables of the prismatic reflective/refractive elements for providing uniform ray emission across the panel. The plurality of prismatic reflective/refractive elements have a predefined relative spacing of the prismatic reflective/refractive elements based upon a position relative to the light source. Also the predefined relative size of each of the prismatic reflective/refractive elements can be based upon its position relative to the light source.

14 Claims, 6 Drawing Sheets

PRISMATIC OPTICAL CONTROL
GRADIENT BY OPTIC SPACING 212

200A

PRISMATIC OPTICAL CONTROL GRADIENT BY OPTIC SIZE 214

OUTWARD OPTICS 400

INWARD OPTICS 402

OUTWARD OPTICS 500

INWARD OPTICS 502

EDGE-LIT LUMINAIRE HAVING PRISMATIC OPTICAL CONTROL

FIELD OF THE INVENTION

The present invention relates generally to edge-lit luminaires and signage devices and in particular to edge-lit luminaires and signage devices having improved prismatic optical control.

DESCRIPTION OF THE RELATED ART

Edge-lit luminaires are known. For example, U.S. Pat. No. 5,283,968 discloses an edge-lit luminaire including a housing containing a source of illumination arranged substantially adjacent to a display panel attached by one edge to the housing such that the panel extends from an opening in the housing. The display panel has an array of dots on at least part of one surface. The dots have a luminosity selected to be affected by illumination provided by the source located in the housing. As described, the display panel may consist of two sheets of transparent material, each of substantially identical dimensions at least one of which has an array of dots on a surface and sandwiching between them a sheet or card of opaque colored material. The sheet or card of opaque colored material is optional and the two sheets can be placed together without any intervening material.

U.S. Pat. No. 5,625,968 discloses an edge-lit illuminated display system one edge operable with a light source for illuminating the first and second surfaces. A matrix of dots on each of the surfaces is arranged to allow interaction of light between the surfaces. The dots can be applied to the transparent sheet by etching, painting, screen printing or other means of applying a medium to a transparent sheet. Alternatively, the matrix of dots may be applied to a transparent film that is then adhered to the transparent sheet.

A need exists for a mechanism for providing improved edge-lit luminaires. It is desirable to provide such improved edge-lit luminaires having panels controlling illumination using reflection to redirect rays traveling within the panel, from nearly parallel to the surfaces to nearly perpendicular to those surfaces. As used in the present specification and claims, edge-lit luminaires includes signage devices and all edge-lit panel applications including but not limited to, signs, displays, task and area lighting.

SUMMARY OF THE INVENTION

A principal object of the present invention is to provide a mechanism for providing improved edge-lit luminaires. Other important objects of the invention are to provide such improved edge-lit luminaires providing superior panel lighting performance substantially without negative effect and that overcome many of the disadvantages of prior art arrangements.

In brief, an edge-lit luminaire is provided. The edge-lit luminaire includes a panel formed of a transparent material. The panel includes first and second opposing surfaces. At least one edge light source is positioned proximate to the panel. A plurality of prismatic reflective/refractive elements are spaced apart on a predefined pattern on the second surface.

In accordance with features of the invention, the plurality of prismatic reflective/refractive elements have a predefined contour for accurate ray direction control. The predefined pattern on the second surface may include predefined gradient spacing and size variables of the prismatic reflective/refractive elements for providing uniform ray emission across the panel. The plurality of prismatic reflective/refractive elements have a predefined relative spacing of the prismatic reflective/refractive elements based upon a relative position to the light source. A predefined relative size of each of the prismatic reflective/refractive elements is based upon its

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
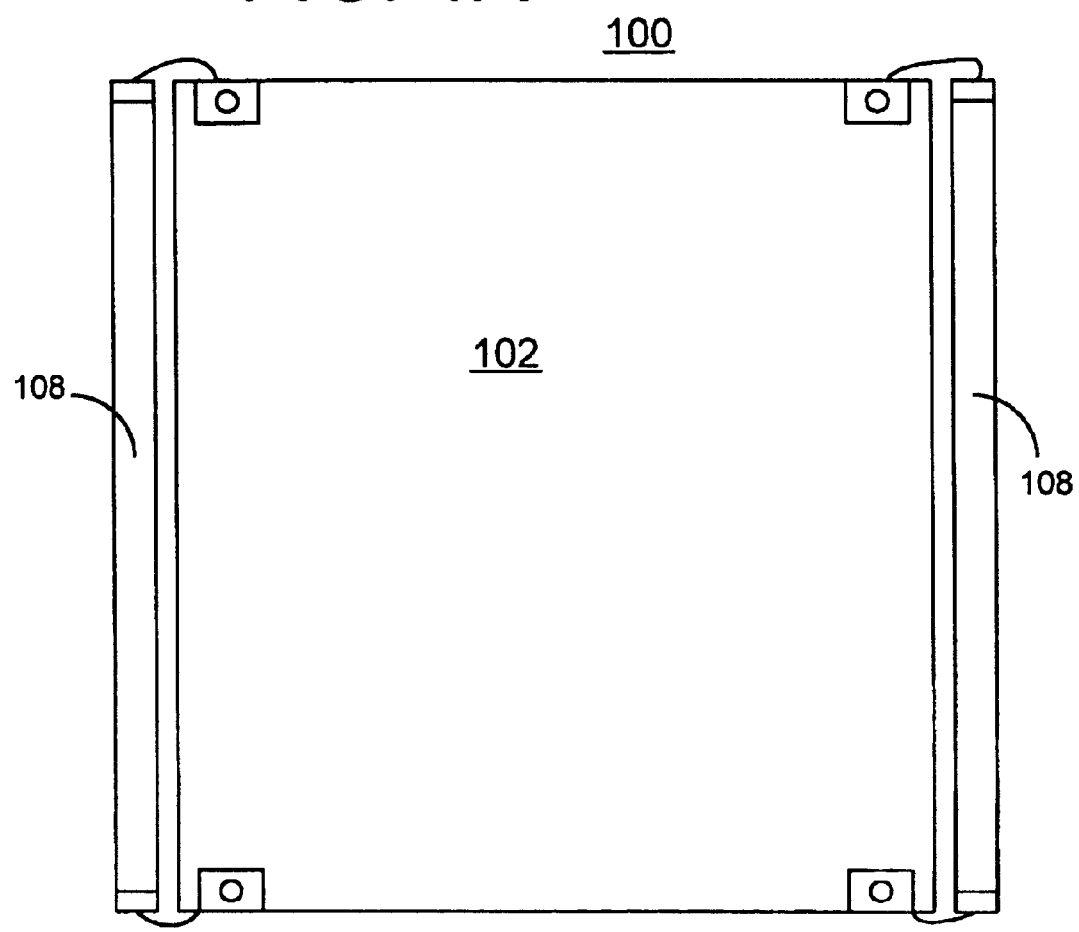
FIGS. 1A and 1B are a plan and a side view of an edge-lit luminaire of the preferred embodiment.
Figure 1B:
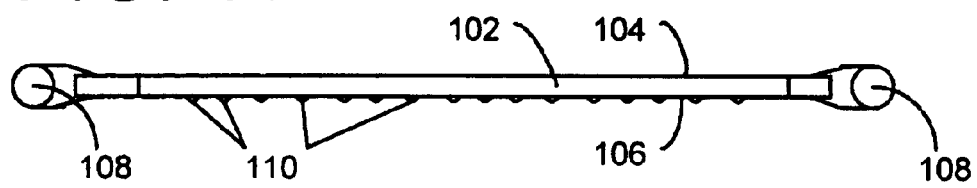

Having reference now to the drawings, FIGS. 1A and 1B illustrate an edge-lit luminaire of the preferred embodiment generally designated by the reference character 100. Edge lit luminaire 100 includes at least one panel 102 formed of a transparent material, such as an acrylic material. The panel 102 includes first and second opposing surfaces 104 and 106. At least one edge light source 108 is positioned proximate to the panel 102 for generating internal light rays traveling within the panel 102. A plurality of 3-dimensional, shaped prismatic reflective/refractive elements 110 are spaced apart on a predefined gradient on the second surface 106 of the panel 102. The panel 102 can be a generally flat member or the panel 102 can be a tapered or wedge shaped member with the thicker panel portion nearest the light source 108. The prismatic reflective/refractive elements 110 provide panel controlled illumination using reflection and refraction to redirect rays traveling within the panel 102, from nearly parallel to the surfaces 104, 106 to nearly perpendicular to those surfaces.

The prismatic reflective/refractive elements 110 are precisely contoured prismatic elements positioned on the surface 106 of a particular parallel surfaced panel 102 to provide controlled reflected light rays at a multitude of desired angles generally normal to the light rays within the panel 102 as provided by one or more light sources 108. As shown in FIG. 1B, each of the prismatic reflective/refractive elements 110 projects or extends outwardly from the surface 106, thus not interfering with the travel of internal rays directed further into the panel 102 while reflecting the internal rays that do impinge on the element. With prismatic reflective/refractive elements 110 that project or extend inwardly from the surface 106, some interference with the travel of internal rays results; in some configurations this arrangement may have a benefit of more efficiently emitting light rays within specific zones.

In accordance with features of the invention, the relative spacing and/or size of each of the prismatic reflective/refractive elements 110 is precisely related to its distance from the light source 108 so as to provide uniform reflected light emissions from across the entire panel 102 by compensating for the light ray reduction by prismatic reflective/refractive elements 110 closer to the light source 108. The controlled redirection and efficiency of the prismatic reflective/refractive elements 110 of the preferred embodiment provides superior panel lighting performance in such applications as signs, displays, task and area lighting. Where the edge light source 108 is remote, the light rays are emitted without appreciable heat energy being introduced into the illuminated area. The prismatic reflective/refractive elements 110 provide a reflective function and a secondary refractive function.

The same reference characters as used in FIGS. 1A and 1B to describe the edge-lit luminaire 100 are used to describe identical or similar parts with respect to FIGS. 2A, 2B, 3, 4A, 4B, 5A, and 5B.

Figure 2A:
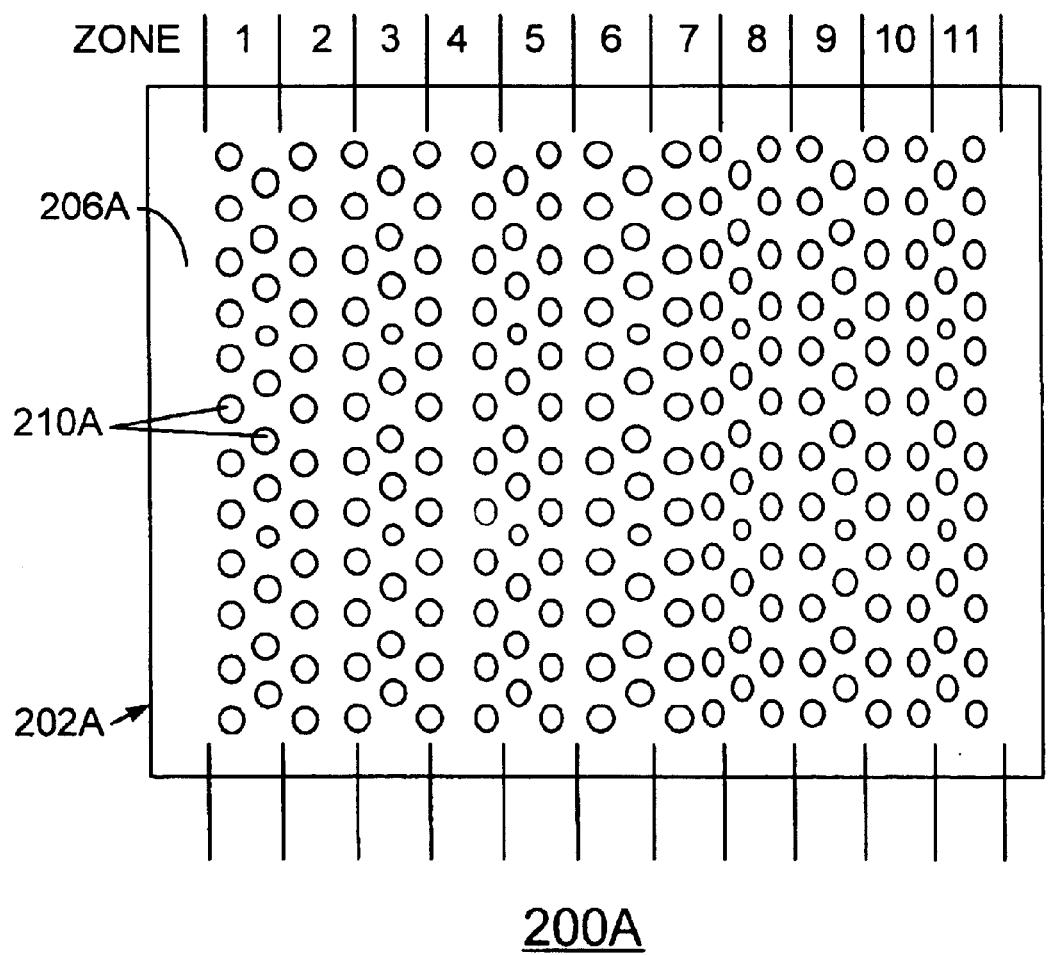
FIGS. 2A and 2B are views illustrating a plurality of prismatic reflective/refractive elements spaced apart on a predefined gradient on a second surface of a panel of an edge-lit luminaire of the preferred embodiment.
Figure 2B:
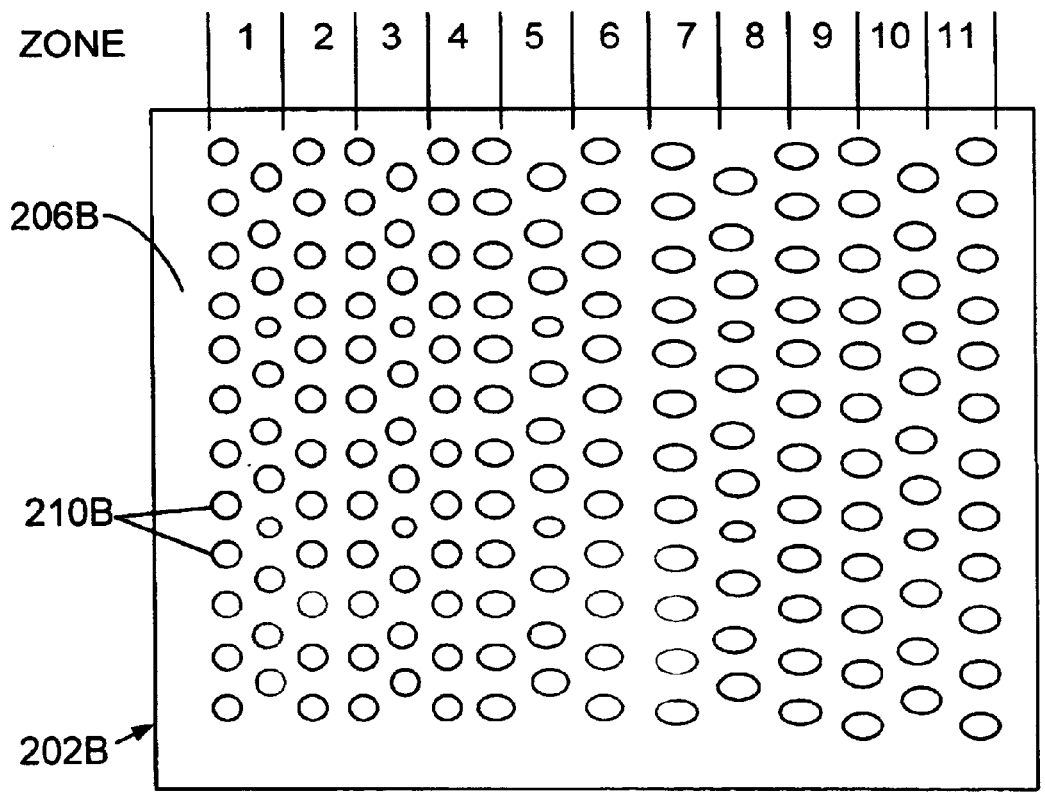

FIGS. 2A and 2B respectively illustrate an edge-lit luminaire of the preferred embodiment generally designated by the reference character 200A, 200B. A plurality of prismatic reflective/refractive elements 210A, 210B spaced apart on a predefined gradient on a second surface 206A, 206B of panel 202A, 202B of the edge-lit luminaire 200A, 200B. FIG. 2A illustrates a prismatic optical control gradient by optic spacing 212. FIG. 2B illustrates a prismatic optical control gradient by optic size 214. In FIGS. 2A and 2B, a plurality of zones 1–11 are shown where for example, the relative spacing and/or size of each of the prismatic reflective/refractive elements 210A, 210B may be sequentially varied.

Figure 3:
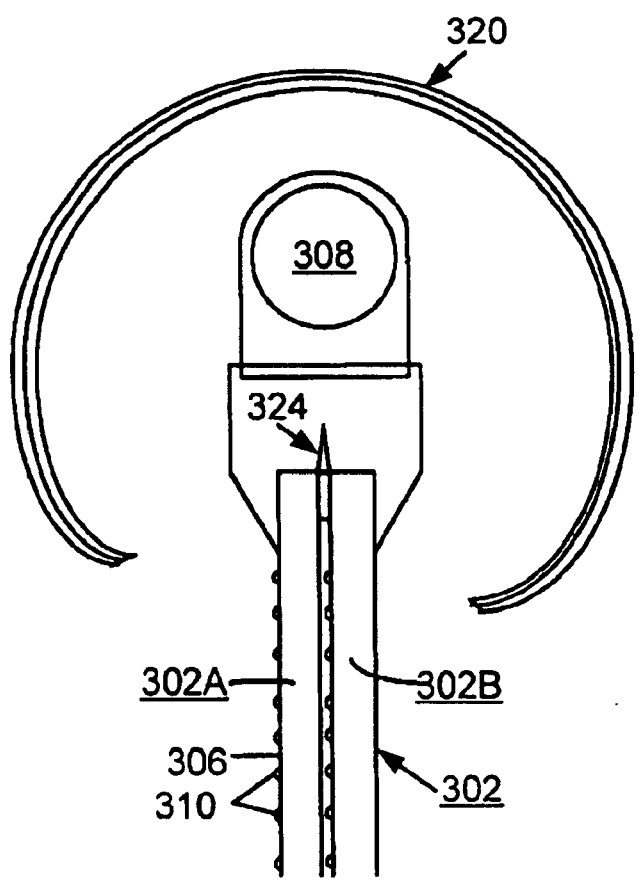
FIG. 3 illustrates an application of the edge-lit luminaire of the preferred embodiment including a fluorescent lamp, a reflector system and a reflector blade between a pair of panels of an edge-lit luminaire of the preferred embodiment.

FIG. 3 illustrates an application of an edge-lit luminaire generally designated by the reference character 300 of the preferred embodiment including a fluorescent lamp used as a light source 308 together with an associated reflector 320. A reflector blade 324 is positioned between a pair of panels 302A and 302B forming panel 302 of the edge-lit luminaire 300. A plurality of prismatic reflective/refractive elements 310 is spaced apart on a predefined pattern on a second surface 306 of the panel 102. The reflector blade 324 is used between the 302A and 302B to reflect the light from the source 308 into the panel 302 at the correct entrance angle for internal reflection.

Figure 4A:
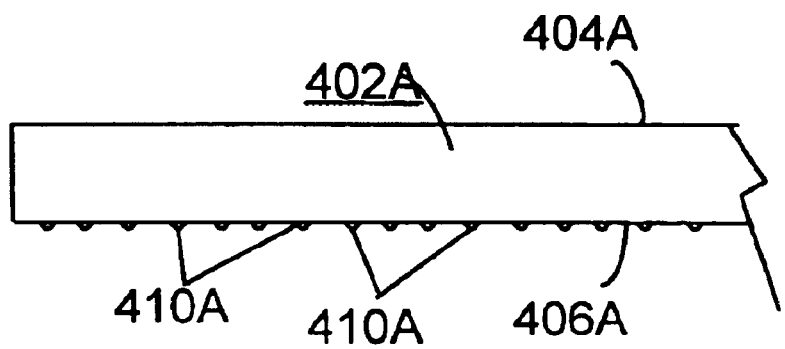
FIGS. 4A and 4B are views respectively illustrating outward optics and inward optics of the preferred embodiment on a second surface of a panel of an edge-lit luminaire of the preferred embodiment.
Figure 4B:
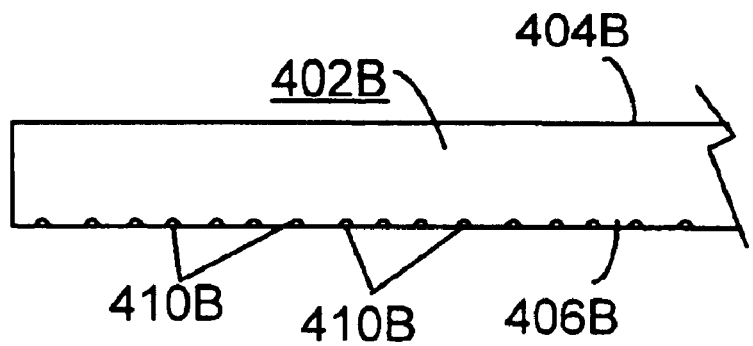

FIGS. 4A and 4B respectively illustrate outward optics 400 and inward optics 402 of the preferred embodiment on a second surface 406A, 406B of a panel 402A, 402B of an edge-In luminaire of the preferred embodiment. In FIG. 4A, the illustrated outward optics 400 include outwardly extending prismatic reflective/refractive elements 410A as shown in FIG. 1B. In FIG. 4B, the illustrated inward optics 402 include inwardly extending prismatic reflective/refractive elements 410B. The prismatic reflective/refractive elements 410A and 410B are formed respectively onto the second surface 406A, 406B, for example, by being molded, cast, extruded or embossed.

Figure 5A:
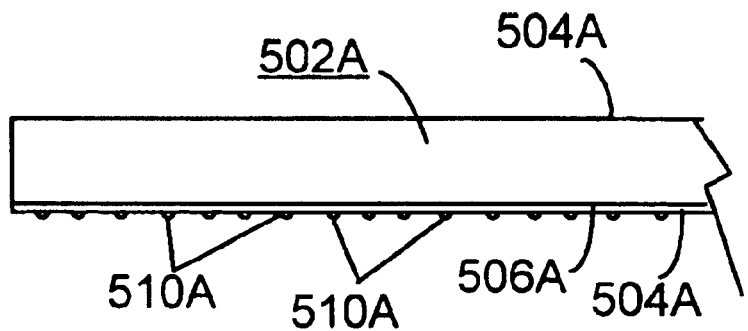
FIGS. 5A and 5B are views respectively illustrating outward optics and inward optics of the preferred embodiment on a film applied to a second surface of a panel of an edge-lit luminaire of the preferred embodiment.
Figure 5B:
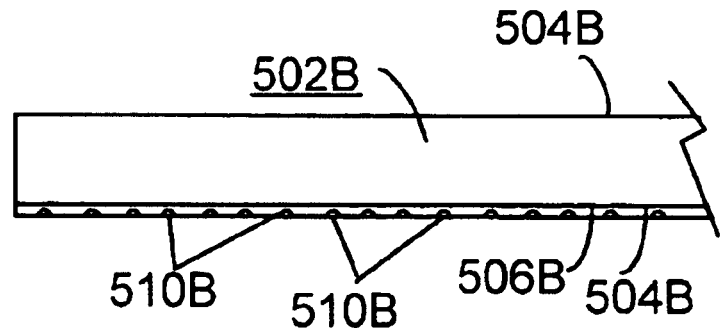

FIGS. 5A and 5B respectively illustrate outward optics 500 and inward optics 502 of the preferred embodiment formed on a film 504A, 504B. The film 504A, 504B is applied to a second surface 506A, 506B of a panel 502A, 502B of an edge-lit lumininaire, such as the edge-lit luminaire 100 of FIG. 1. In FIG. 5A, the illustrated outward optics 500 include outwardly extending prismatic reflective/refractive elements 510A. In FIG. 5B, the illustrated inward optics 502 include inwardly extending prismatic reflective/refractive elements 510B. It should be understood that the prismatic reflective/refractive elements 210A, 210B, 310 provide identical functions including the reflective function and the secondary refractive function as the prismatic reflective/refractive elements 110 of FIGS. 1A and 1B. It should be understood that the principles of the present invention are not limited to the use of the prismatic reflective/refractive elements 110, 210, 310, 410A, 410B, 510A and 510B provided only on one of the panel surfaces. It should be understood that the prismatic reflective/refractive elements 110, 210, 310, 410A, 410B, 510A and 510B can be provided on either or both of the panel surfaces in an edge-lit luminaire of the preferred embodiment.

While the present invention has been described with reference to the details of the embodiments of the invention shown in the drawing, these details are not intended to limit the scope of the invention as claimed in the appended claims.

What is claimed is:

1. An edge-lit luminaire comprising:
   a panel formed of a transparent material; said panel including first and second opposing surfaces;
   at least one edge light source positioned proximate to said panel; and
   a plurality of prismatic reflective/refractive elements integrally formed with said panel and spaced apart on a predefined pattern on said second surface; each of said prismatic reflective/refractive elements extending from said second surface and providing a reflective function and a refractive function and each of said prismatic reflective/refractive elements being precisely contoured elements providing controlled reflected light rays at a multitude of predefined angles; said predefined pattern of said spaced apart plurality of prismatic reflective/refractive elements and a size of each said plurality of prismatic reflective/refractive elements being selectively provided relative to said at least one edge light source for panel controlled illumination.

2. An edge-lit luminaire as recited in claim 1 wherein said plurality of prismatic reflective/refractive elements spaced apart on said predefined pattern on said second surface includes predefined gradient spacing and size variables of said prismatic reflective/refractive elements for providing uniform ray emission across said panel.

3. An edge-lit luminaire as recited in claim 1 wherein said plurality of prismatic reflective/refractive elements are formed in a film; and said film applied to said second surface.

4. An edge-lit luminaire as recited in claim 1 wherein said panel formed of a transparent material has a predefined thickness for acceptance of a majority of rays emitted by said light source.

5. An edge-lit luminaire as recited in claim 1 further includes a reflector operatively associated with said light source.

6. An edge-lit luminaire as recited in claim 1 wherein said plurality of prismatic reflective/refractive elements are outwardly extending prism elements.

7. An edge-lit luminaire as recited in claim 1 wherein said plurality of prismatic reflective/refractive elements are inwardly extending prism elements.

8. An edge-lit luminaire as recited in claim 1 wherein said plurality of prismatic reflective/refractive elements are formed onto said second surface during production of said panel.

9. An edge-lit luminaire as recited in claim 8 wherein said plurality of prismatic reflective/refractive elements are formed onto said second surface by one of being molded, cast, extruded or embossed.

10. An edge-lit luminaire as recited in claim 1 wherein said panel formed of a transparent material is formed by a plurality of panels sandwiched together.

11. An edge-lit luminaire as recited in claim 10 further includes a reflector blade for directing light rays from said light source into at least one pair of said plurality of panels sandwiched together.

12. An edge-lit luminaire comprising:

a panel formed of a transparent material; said panel including first and second opposing surfaces;

at least one edge light source positioned proximate to said panel; and a plurality of prismatic reflective/refractive elements integrally formed with said panel and spaced apart on a predefined pattern on said second surface; each of said prismatic reflective/refractive elements formed integral with said panel and extending either inwardly or outwardly from said second surface and providing a reflective function and a refractive function and having a predefined contour for accurate ray direction control; and said predefined pattern of said plurality of prismatic reflective/refractive elements on said second surface including predefined gradient spacing and size variables of said prismatic reflective/refractive elements relative to said at least one edge light source for providing substantially uniform reflected light ray emission across said panel.

13. An edge-lit luminaire comprising:

a panel formed of a transparent material; said panel being formed by a plurality of panels sandwiched together; and each said panel including first and second opposing surfaces;

at least one edge light source positioned proximate to said panel; and a plurality of prismatic reflective/refractive elements integrally formed with each said panel and spaced apart on a predefined pattern on said second surface; each of said prismatic reflective/refractive elements formed integrally with said second surface and extending either inwardly or outwardly from said second surface and providing a reflective function and a refractive function and having a predefined contour for accurate ray direction control; and at least one of said plurality of panels sandwiched together having said plurality of prismatic reflective/refractive elements spaced apart at a predefined gradient relative to said at least one light source.

14. A panel for an edge-lit luminaire comprising:

a panel formed of a transparent material; said panel including first and second opposing surfaces; and a plurality of prismatic reflective/refractive elements integrally formed with said panel and spaced apart on a predefined pattern on said second surface at a predefined gradient relative to said at least one light source; each of said prismatic reflective/refractive elements comprising a three-dimensional structure formed integrally with said second surface and extending either inwardly or outwardly from said second surface providing a reflective function and a refractive function and having a predefined contour for accurate ray direction control; said predefined pattern of said spaced apart plurality of prismatic reflective/refractive elements and a size of each said plurality of prismatic reflective/refractive elements being provided for panel controlled illumination.

* * * * *

UNITED STATES PATENT AND TRADEMARK OFFICE
CERTIFICATE OF CORRECTION

PATENT NO.    : 6,767,106 B2
DATED         : July 27, 2004
INVENTOR(S)   : Josh Barnes et al.

It is certified that error appears in the above-identified patent and that said Letters Patent is hereby corrected as shown below:

<u>Title page,</u>
Item [75], Inventors, correct the inventor name as follows:

-- Paul Carleton Belding --

Signed and Sealed this

Sixteenth Day of November, 2004

JON W. DUDAS
*Director of the United States Patent and Trademark Office*